(12) United States Patent
Brogårdh

(10) Patent No.: US 6,974,297 B2
(45) Date of Patent: Dec. 13, 2005

(54) INDUSTRIAL ROBOT

(75) Inventor: Torgny Brogårdh, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/399,763

(22) PCT Filed: Oct. 19, 2001

(86) PCT No.: PCT/SE01/02291

§ 371 (c)(1),
(2), (4) Date: Aug. 29, 2003

(87) PCT Pub. No.: WO02/34480

PCT Pub. Date: May 2, 2002

(65) Prior Publication Data

US 2004/0028516 A1    Feb. 12, 2004

(30) Foreign Application Priority Data

Oct. 24, 2000 (SE) .................................. 0003912

(51) Int. Cl.[7] .............................................. B25J 17/02
(52) U.S. Cl. ................... 414/680; 74/490.06; 414/735; 901/29
(58) Field of Search .............................. 414/680, 735; 901/15, 23, 28, 29; 74/490.01, 490.03, 490.06

(56) References Cited

U.S. PATENT DOCUMENTS

| RE26,904 E | * | 6/1970 | Lemelson ................... 414/730 |
| 4,806,068 A | | 2/1989 | Kohli et al. |
| 5,333,514 A | * | 8/1994 | Toyama et al. ......... 414/735 X |
| 6,099,217 A | | 8/2000 | Wiegand et al. |
| 6,213,319 B1 | * | 4/2001 | Khachaturian ............... 212/270 |
| 6,325,591 B1 | * | 12/2001 | Focke et al. ............. 414/749.1 |

FOREIGN PATENT DOCUMENTS

| DE | 19525482 | * | 1/1997 |
| DE | 19611130 | * | 9/1997 |
| WO | 99/32256 | | 7/1999 |

* cited by examiner

Primary Examiner—Donald W. Underwood
(74) Attorney, Agent, or Firm—Venable LLP; Eric J. Franklin

(57) ABSTRACT

An industrial robot for movement of an object in space comprising a platform arranged for carrying the object, a first arm arranged for influencing the platform in a first movement and comprising a first actuator and two links, each of which comprises an outer joint arranged in the platform and an inner joint arranged in the first actuator, a second arm arranged for influencing the platform in a second movement and comprising a second actuator and two links, each of which comprises an outer joint arranged in the platform and an inner joint arranged in the second actuator, and a third arm arranged for influencing the platform in a third movement and comprising a third actuator and a link, which comprises an outer joint arranged in the platform and an inner joint arranged in the third actuator. The first actuator comprises a first motor, a first path arranged in a first plane and a first carriage linearly movable along the first path, whereby the two inner joints are displaceable in parallel, the second actuator comprises a second motor, a second path arranged in a second plane and a second carriage linearly movable along the second path, whereby the two inner joints are displaceable in parallel, and the third actuator comprises a third motor, a third path arranged in a third plane and a third carriage linearly movable along the third path, whereby the inner joint is linearly displaceable.

10 Claims, 18 Drawing Sheets

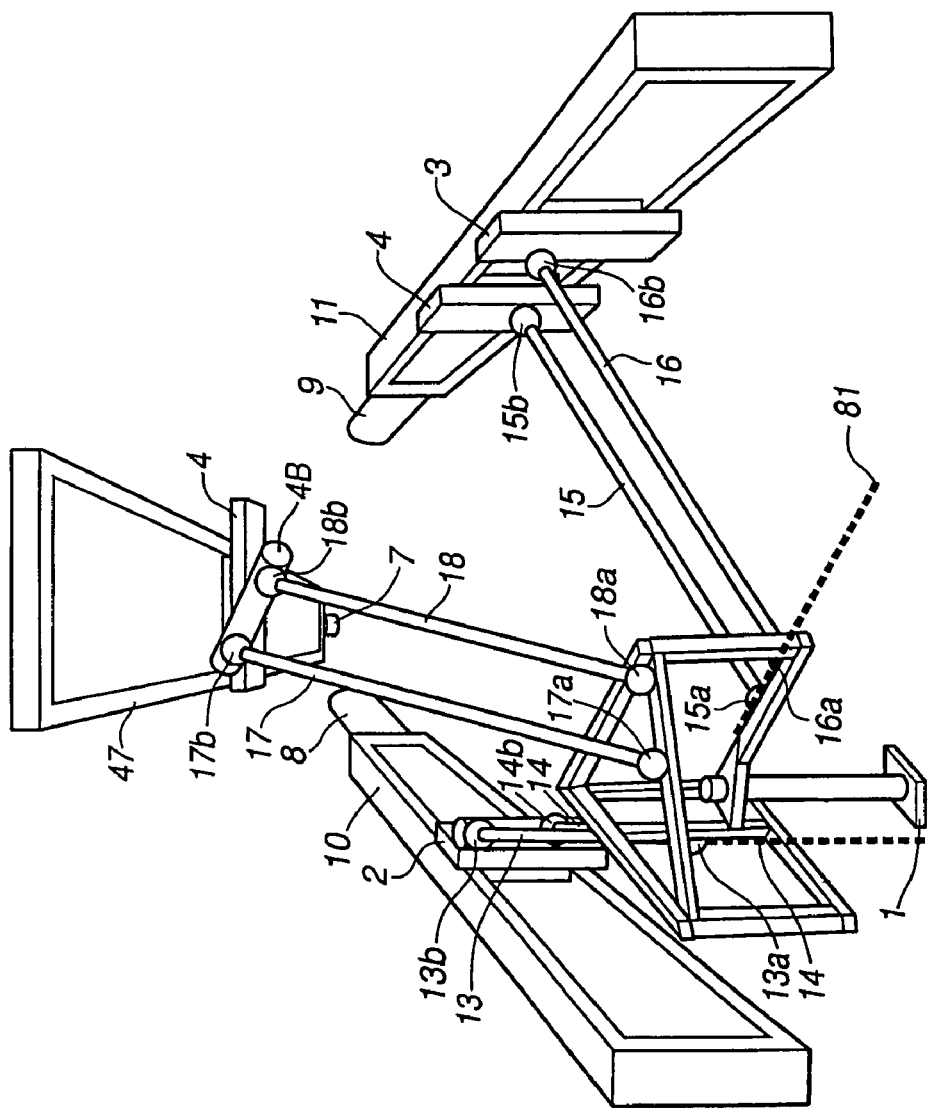
Fig. 18
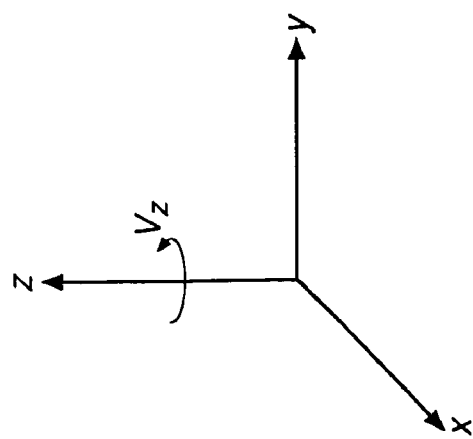

INDUSTRIAL ROBOT

TECHNICAL FIELD

The present invention relates to an industrial robot comprising a manipulator and control equipment for moving an object in space. The manipulator comprises a platform jointly supported by a plurality of arms comprising linkages. Each arm is associated with an actuator with the purpose of moving the linkage of the arm in parallel such that a movement of the platform is attained. The task of the platform is to directly or indirectly support tools or objects, large as well as small, for movement, measurement, processing, working, joining, etc. In particular, the manipulator is intended to be used in the manufacturing industry but also transfer of goods and passageways for passengers in harbours and airports may come into question.

BACKGROUND ART

A manipulator which comprises more than one arm and where at least two arms each form a chain of joints between the actuators of the manipulator and the platform which is to be manipulated is called a parallel kinematic manipulator. For a fully built-up parallel kinematic manipulator for movement of a platform with three degrees of freedom (e.g. in directions x, y and z in a Cartesian system of coordinates), three parallel-working arms are required, and if all the six degrees of freedom of the platform are to be manipulated, six parallel-working arms are required. In many industrial applications where at present linear manipulators of a socalled gantry type are used, four degrees of freedom are normally required, which means that a corresponding parallel kinematic manipulator shall have four parallel arms.

To obtain a stiff arm system with a large loading capacity and a low weight, the lower arms of the parallel kinematic manipulator nearest the manipulated platform shall have a total of six links which only transmit compressive and tensile forces. For a manipulator for four degrees of freedom and four arms, this implies that the four lower arms must share the six links between them and this can only be done with certain combinations, such as, for example, 2/2/1/1 or 3/1/1/1. If one of the links is used for transmitting torque in addition to compressive and tensile forces, the following possible combinations for a parallel kinematic manipulator with four degrees of freedom are also obtained: 3/2/1, 2/2/2. These combinations may also be used when only three degrees of freedom are to be manipulated in the manipulated platform.

When a rectangular working range is required in manipulator applications, so-called gantry manipulators are used today. These manipulate a platform with normally four degrees of freedom: x, y, z and rotation around the z-axis. To this end these manipulators are composed of one axis of rotation and three series-connected linear paths, on which movable units are moved in the x-, y- and z-directions. The first movable unit, which is moved along a first linear path of an actuator, supports a second linear path mounted perpendicular to the first linear path. On the second linear path, there is then a second movable unit which in turn supports a third linear path, which is mounted perpendicular to both the first and second linear paths. On the third linear path there is a third movable unit, which supports an axis of rotation when the manipulator has four degrees of freedom.

The series connection of the linear paths with their associated movable units and actuators impose a number of restrictions on current gantry manipulators.

The manipulator becomes very heavy, which limits its speed of action and results in a need of expensive and energy-consuming actuators (motors).

The manipulator becomes weak and when objects or tools are moved, a undesired oscillation of the manipulator is obtained in case of movement along the path where the movement is to be made, and especially when the movement is to be stopped, so-called overshoots are obtained.

The manipulator becomes resilient when the platform is to generate forces between tools and objects, unless very expensive and complex solutions for the liner paths are used.

For the movable actuators with their associated measuring sensors, movable cabling is required, which causes poor reliability in gantry manipulators.

It is difficult to obtain high accuracy of the manipulator without providing expensive solutions involving, for example, air bearings, which at the same time give the manipulator limited speed of action.

Two parallel linear paths are normally used for supporting the second linear path in the serial kinematic chain. This gives rise to an effect similar to that of a drawer in a chest of drawers getting wedged when being pushed it, and requires special, costly solutions to manage.

All of these limitations when using gantry manipulators can be eliminated by a parallel kinematic manipulator which is driven by parallel-working linear paths, which do not need to support each other but where all the paths may be mounted on a fixed frame structure. An example of such a parallel kinematic robot is Hexaglide, developed at the Technical Institute of Technology ETH in Zurich. The kinematics of this is clear from FIG. 1, which is described in the section DESCRIPTION OF THE PREFERRED EMBODIMENTS. Here, six movable units on three linear paths are used for guiding six degrees of freedom of the manipulated platform with the aid of six parallel links. This manipulator will have an arm system with a very low weight, will be rigid, may achieve large tool forces without yielding, has no movable cabling and may be given very high accuracy. However, this manipulator has too small a working range to replace the gantry manipulators that are used at present in various industrial applications. In addition, this parallel kinematic robot requires six actuators also when only four degrees of freedom are to be manipulated, which results in an unnecessarily high price of the manipulator. Finally, the control programs which are to attend to the movement of the manipulator become extensive.

SUMMARY OF THE INVENTION

The present invention comprises a new base structure for parallel kinematic manipulators based on linearly driven actuators and which solve the problems which occur in the parallel kinematic manipulator described above. With the embodiments for parallel kinematic manipulators based on the new base structure described in this invention, most of the current industrial requirements of manipulators with rectangular working ranges may be solved at a lower cost and with a higher performance compared with current serial kinematic gantry structures. Examples of gantry manipulators which may be replaced by a parallel kinematic structure according to the invention are:

Coordinates measuring machines for high-precision measurement of components and prefabricated products in the engineering industry.

Machine tools for grinding, drilling, milling, deburring and other machining.

Test machines in semiconductor manufacture, wherein semiconductor plates are to be moved to a probe station and be pressed with great force against a matrix of contacts for measuring the quality of the semiconductor material.

Assembly machines for electronics, wherein the electronic components with great speed and high precision are to be moved to a correct position on, for example, a printed circuit board.

Handling robots for pharmaceutical applications, for example for moving microplates during screening.

Handling robots for moving components and products in the engineering industry, for example during assembly of cars.

The invention comprises a manipulator which is composed of a parallel kinematic arm system which is driven by movable units on parallel linear paths. The requirement that the linear paths be parallel is due to the fact that the working range of the manipulator is to be rectangular and scalable. By choosing different lengths of the parallel linear paths, different lengths of the working range may be obtained and by choosing different distances between the parallel linear paths, different widths of the working range may be achieved. The linear paths may be floor-mounted, wall-mounted, roof-mounted, or be a combination of these methods of mounting. In all of these cases, the drive system including actuators rigidly mounted on the linear paths and no movable cabling needs to accompany the movable units when these are moved along the linear paths.

Thus, the invention comprises a manipulator for moving an object in space comprising a platform designed for supporting objects, a first arm adapted to influence the platform in a first movement and comprising a first actuator and two links, each of which comprises an outer joint arranged in the platform and an inner joint arranged in the first actuator, a second arm adapted to influence the platform in a second movement and comprising a second actuator and two links, each of which comprises an outer joint arranged in the platform and an inner joint arranged in the second actuator, and a third joint adapted to influence the platform in a third movement and comprising a third actuator and a link, which comprises an outer joint arranged in the platform and an inner joint arranged in the third actuator, whereby the first actuator comprises a first motor, a first path arranged in a first plane and a first carriage linearly movable along the first path, by means of which the two inner joints are displaceable in parallel, the second actuator comprises a second motor, a second path arranged in a second plane and a second carriage linearly displaceable along the second path, by means of which the two inner joints are displaceable in parallel, and that the third actuator comprises a third motor, a third path arranged in a third plane and a third carriage linearly movable along the third path, by means of which the inner joint is linearly displaceable.

In an advantageous embodiment of the invention, all the outer joints are arranged along one and the same straight line of the platform.

In another advantageous embodiment, the first arm comprises an additional link with an inner joint arranged in the first carriage and an outer joint arranged in the platform, whereby all the links of the first arm are arranged in parallel.

In other embodiments, the paths are arranged in different ways. They are thus arranged in the same plane, in different planes, or in angled planes. The paths are also arranged jointly for several carriages.

In yet another embodiment, the manipulator is arranged with a fourth arm for influencing a fourth movement of the manipulator. This movement may be rotation of the platform.

The movable units, the carriages, which move with parallel linear movements on the linear paths, support the parallel kinematic arm system. To obtain a high rigidity, a high accuracy and a low weight of the arm system, this system is designed such that the platform that is to be manipulated is mounted with the aid of joints on six links (articulated rods), with one joint per articulated rod. Each joint has two or three degrees of freedom and the articulated rods are configured such that they may lock or manipulate each one of the six degrees of freedom of the platform. In their other end, the articulated rods are mounted via joints either directly on the movable units or on some type of arm which in turn is mounted on one or more of the movable units. Also at their other end, the articulated rods have joints with two or three degrees of freedom and the articulated rods are, in all cases but one, configured in such a way that they only need to transmit compressive and tensile stresses. The exception is the case where one of the articulated rods is used for transmitting a rotary movement to the manipulated platform. In this case, the articulated rod in question serves as a universal transmission.

The main object of the invention is to suggest ways and means of manufacturing a manipulator with four degrees of freedom for positioning (x, y, z) of the manipulated platform. Additional advantages are obtained by performing rotation of the manipulated platform around an axis (the z-axis) without simultaneously giving rise to rotation of the manipulated platform around any other axis (the x- or z-axis). This manipulation is to be performed with only four movable units on parallel linear paths and should be made with only compressive and tensile stresses in the six articulated rods which connect the manipulated platform directly or indirectly to the movable units.

Thus, according to the invention, the articulated rods are mounted on the manipulated platform with the aid of joints, so that two pairs of links are formed. For each pair, a mathematical line is formed through the centre of the joints of the pairs of links, the centre being defined by the mathematical point in the joint where the axes of rotation of the joint (for pivoting the link) cross each other. To attain the main object of the invention, it is now required that both of the two mathematical lines for the joints of the two pairs of links be parallel. Of special interest is the case where these mathematical lines also coincide.

Starting from this basic structure of a parallel kinematic manipulator with a gantry-like working range, the invention comprises a number of advantageous embodiments.

The inventive concept comprises connecting at least one of the movable units to the manipulated platform via only one of the six articulated rods. In this way, no requirements are made for orientation in any direction of the arm on which the link in question is mounted via a joint. This provides many possibilities of introducing pivotable lower arms to increase the working range of the manipulator in the z-direction. This is of particular importance when a manipulator with only three degrees of freedom (x, y, z) is to be designed.

To obtain a large working range in the xy-plane, that is, in the plane in which at least two of the liner paths are mounted, according to an advantageous embodiment of the invention two of the linear paths with associated movable units are mounted such that at least four of the six links are able to move freely between the two linear paths. This makes it possible for the linkage to perform large movements in the y-direction while simultaneously performing large movements in the z-direction, since the arm system in the middle of the working range between the linear paths will have its greatest mobility in all directions. This configuration of the linear paths is the optimal one also from the point of view of rigidity of the manipulator if the linear paths are mounted such that the normal vectors to the mounting surfaces of the movable units for one of the linear paths are parallel but directed opposite to the mounting surfaces of the movable units for the other linear path.

The inventive concept also comprises achieving the rotation of the manipulated platform around one, and only one, axis of rotation by means of an articulated rod connected to one of the movable units, in which case a lever arm may be used in a platform arrangement for transforming a translatory movement of the relevant link into a rotational movement of the platform. To obtain large angles of rotation of the manipulated platform, the invention also comprises the use of one of the articulated rods in a universal transmission the universal joints being mounted at both ends of the articulated rod in question and a gear wheel and a rack being used for transmitting a relative movement between two movable units on a linear path into a rotational movement of the universal transmission. In addition, the invention comprises use of a third linear path mounted between two other linear paths and with two movable units for manipulating the rotation and movement of the platform in the z-direction, in which case both of the above-mentioned embodiments for generating the rotational movement of the platform may be used.

The inventive concept also comprises different designs for obtaining an extended working range of the manipulated platform with the aid of lever arms. These designs are based on relative movements between two or more movable units, with the aid of articulated couplings between the movable units, giving rise to oscillations of arms mounted on the movable units. In this way, the linear movements of the movable units will give rise to large circular movements of those joints which connect articulated rods to the oscillating arms, and large movements of the manipulated platform are obtained.

In an advantageous embodiment of the invention, at least four of the joints between the manipulated platform and the six articulated rods are mounted along a common symmetrical line, which corresponds to the previously mentioned mathematical lines coinciding. If, in addition, a fifth joint for manipulating the platform in the z-direction is mounted on this symmetry line, the platform will be constituted by a rod or a shaft, which may then be rotated around by the sixth articulated rod via a lever arm or via a universal transmission. This gives a very compact platform, which is easy to manufacture with high precision. In addition, this platform provides a possibility of simply using ordinary ball or roller bearings to implement the joints in question.

BRIEF DESCRIPTION OF THE DRAWINGS

The invention will be explained in greater detail by description of an embodiment with reference to the accompanying drawings, wherein FIG. 18 is an alternative embodiment of the manipulator for illustrating the problems that arise when the main object of the invention is not fulfilled.

DESCRIPTION OF THE PREFERRED EMBODIMENTS

Figure 1:
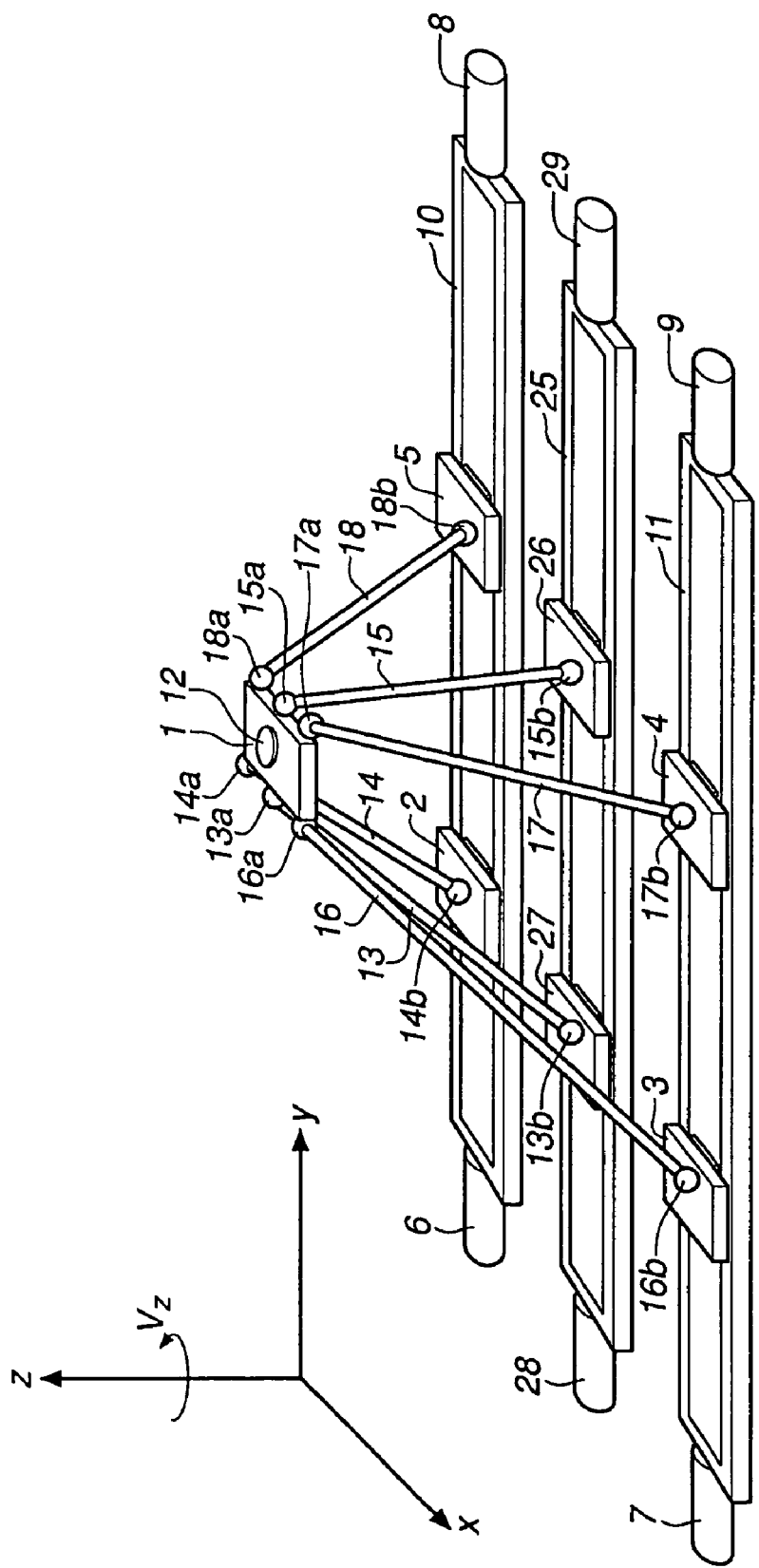
FIG. 1 is a manipulator designed according to the prior art, with parallel linear paths comprising six movable units with six links between these units and the platform which is to be moved and rotated by the manipulator.

FIG. 1 shows the prior art for manipulating, on linear paths 10, 11 and 25, a platform 1 by means of links 13–18, which only transmit compressive and tensile stresses. The six links 13–18 are provided at each end with joints 13a–18a and 13b–16b, respectively. The joints have two or three degrees of freedom and the links are mounted, via the joints 13a–18a, on the platform 1 that is to be manipulated. With the joints 13b–18b, the links are mounted on the movable units 2, 3, 4, 5, 26, 27 with one link for each movable unit. The movable units are controlled by actuators 6, 7, 8, 9, 29 and 28 and may be positioned along the linear paths 10, 11, 25 independently of each other. By performing this positioning in a certain pattern given by the kinematics of the manipulator, the platform may be caused to move in the x-, y-and z-directions and to obtain rotations around the z-axis (Vz). It is also possible to obtain rotations around the x-and y-axes, but there is no need for that in most of the gantry applications that are being used today.

Figure 2:
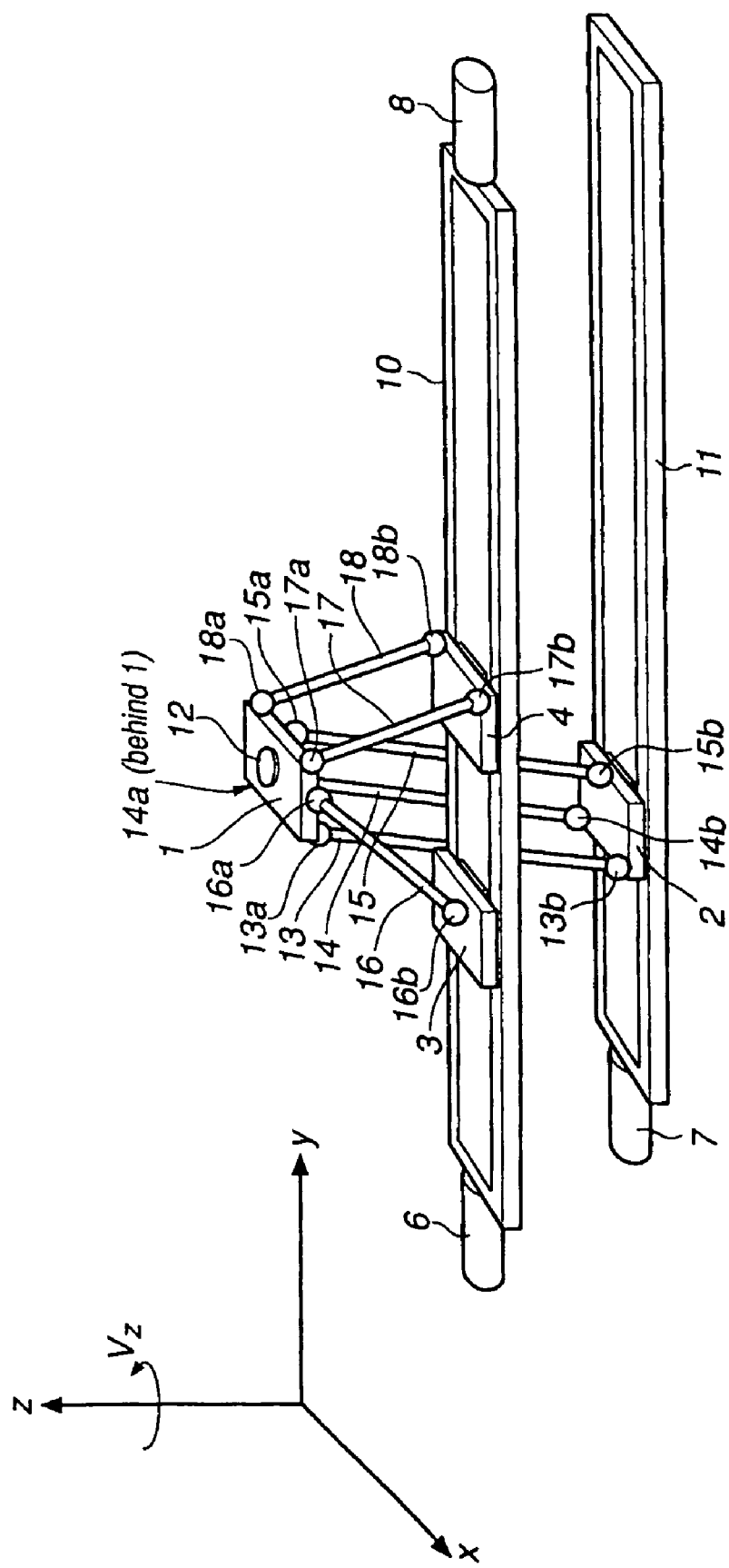
FIG. 2 is a manipulator according to the invention for manipulating the position of a platform under constant tilting and orientation, using only three movable units on only two parallel linear paths via six links.

FIG. 2 shows how a manipulator with three linear actuators may be used for manipulating the position of an object 12, the largest movements being obtained in the y-direction (the y-direction according to the coordinate system written in the figure). The object 12 is placed on a platform 1, which is retained by the six links 13–18. The links 13–15 are mounted at their lower ends on the movable unit 2, which is caused to move along the linear path 11 with the aid of the drive device 7. In a corresponding way, the lower end of the link 16 is mounted on the unit 3, which on the path 10 is connected to the drive device 6. Further, the links 17 and 18 are mounted on the unit 4 with the drive device 8. Each link has, at both ends, joints 13a–18a and 13b–18b, respectively, each having two degrees of freedom (e.g. a universal joint) or three degrees of freedom (e.g. a ball joint). The links 13, 14, and 15 have the same length and are mutually parallel and mounted such that the joints 13a, 14a, 15a and 13b, 14b, 15b, respectively, form triangles. The links 17 and 18 are also mutually parallel and have the same length. On the other hand, the links 13, 14, 15 need not have the same length as the links 17, 18, nor the same length as the link 16, and the link 16 need not have the same length as the links 17 and 18. For high precision and high rigidity, the links are suitably manufactured of carbon-fibre-reinforced epoxy tubes, which are glued to holders for the joints. The units 2, 3, 4 may be driven by ball screws with motors 6, 7, 8 in the ends of the linear units 10, 11. As an alternative, belt transmissions may be used and if very high stiffness and accuracy are required, it is also possible to use linear motors. In the linaear-motor case, the winding should be placed on the stationary part to avoid movable cabling, but this implies that two parallel linear motors are needed for the linear path 10 with two movable units. It should be pointed out that the linear paths 10 and 11 in the embodiment shown in the figure are adjacent to each other (in the x-direction) and at different levels (in the z-direction). The reason for the path 10 being at a higher level than the path 11 is that the distance between the movable units 3 and 4 then becomes smaller and that these units need not be moved to the same extent to obtain a given transfer of the platform 1, which allows the linear path 10 to be made shorter than if all the links had been of equal length.

Figure 3:
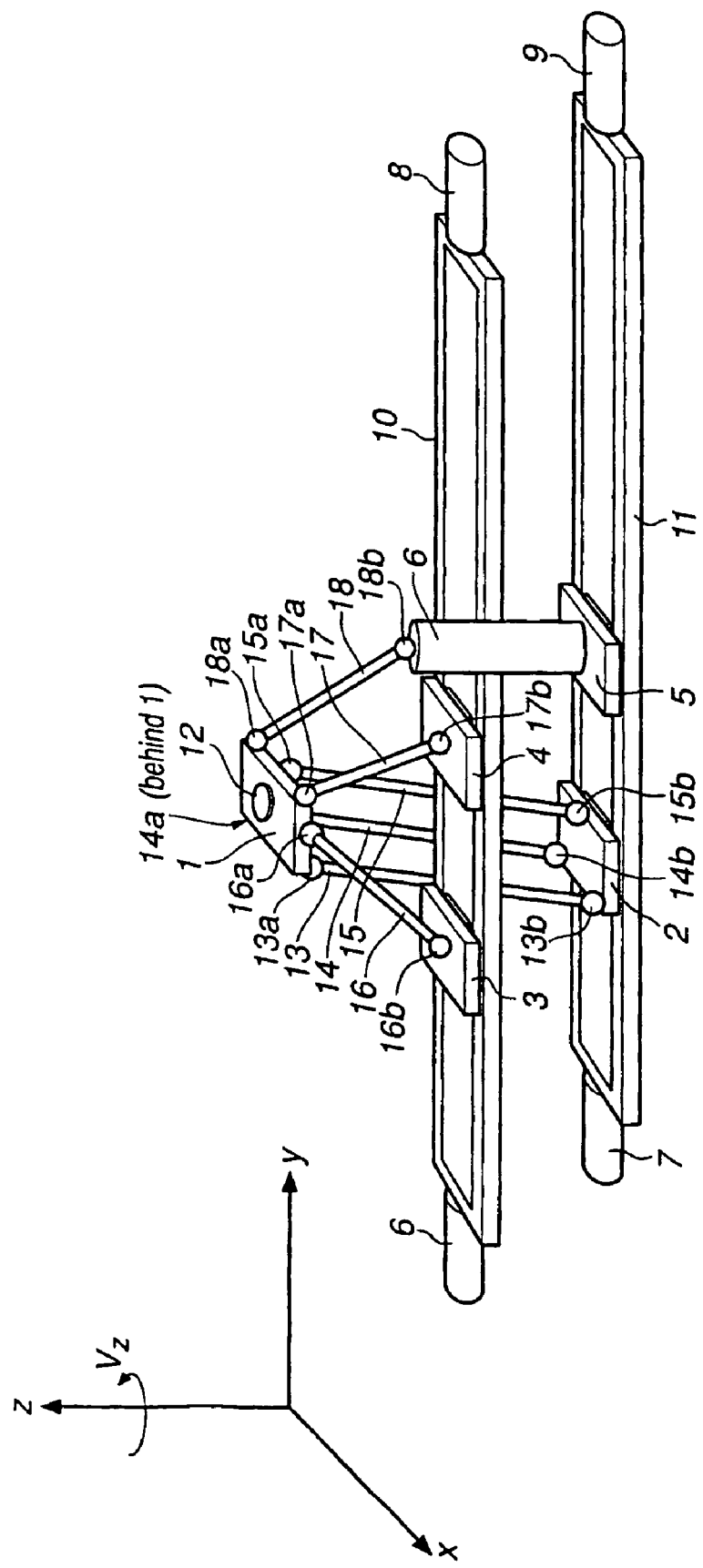
FIG. 3 is a modification of the manipulator according to FIG. 2 with the aim for manipulating, in addition to the position of the platform, also the orientation of the platform, using an additional movable unit on only two parallel linear paths.

For most applications where so-called gantry manipulators are currently used, a fourth degree of freedom is required to also be able to rotate the platform 1 around the z-axis. One possibility of doing so with the structure according to FIG. 2 as a base is to connect the links 17 and 18 to different movable units, which is shown in FIG. 3. Thus, the link 18 has here been connected to a new movable unit 5 via a rod 6, such that the links 17 and 18 can be manipulated independently of each other. The movable unit 5 is moved on the linear path 11 by the drive unit 9. With this modification of the original manipulator in FIG. 2, a rotation of the platform 1 may be obtained by adjusting the relationship between the positions of the movable units 4 and 5. This gives rise to a pure rotation around the z-direction (Vz) when the links 13, 14 and 15 are perpendicular to the movable unit 1, but if the angle of the these links relative to the movable unit 1 deviates from 90 degrees, the rotation of the platform 1 will be accompanied by a change of the inclination of the platform. The greater the deviation from 90 degrees, the greater will be the change of inclination as a function of the rotation of the platform, and therefore the manipulator in FIG. 3 has a limited use.

Figure 4:
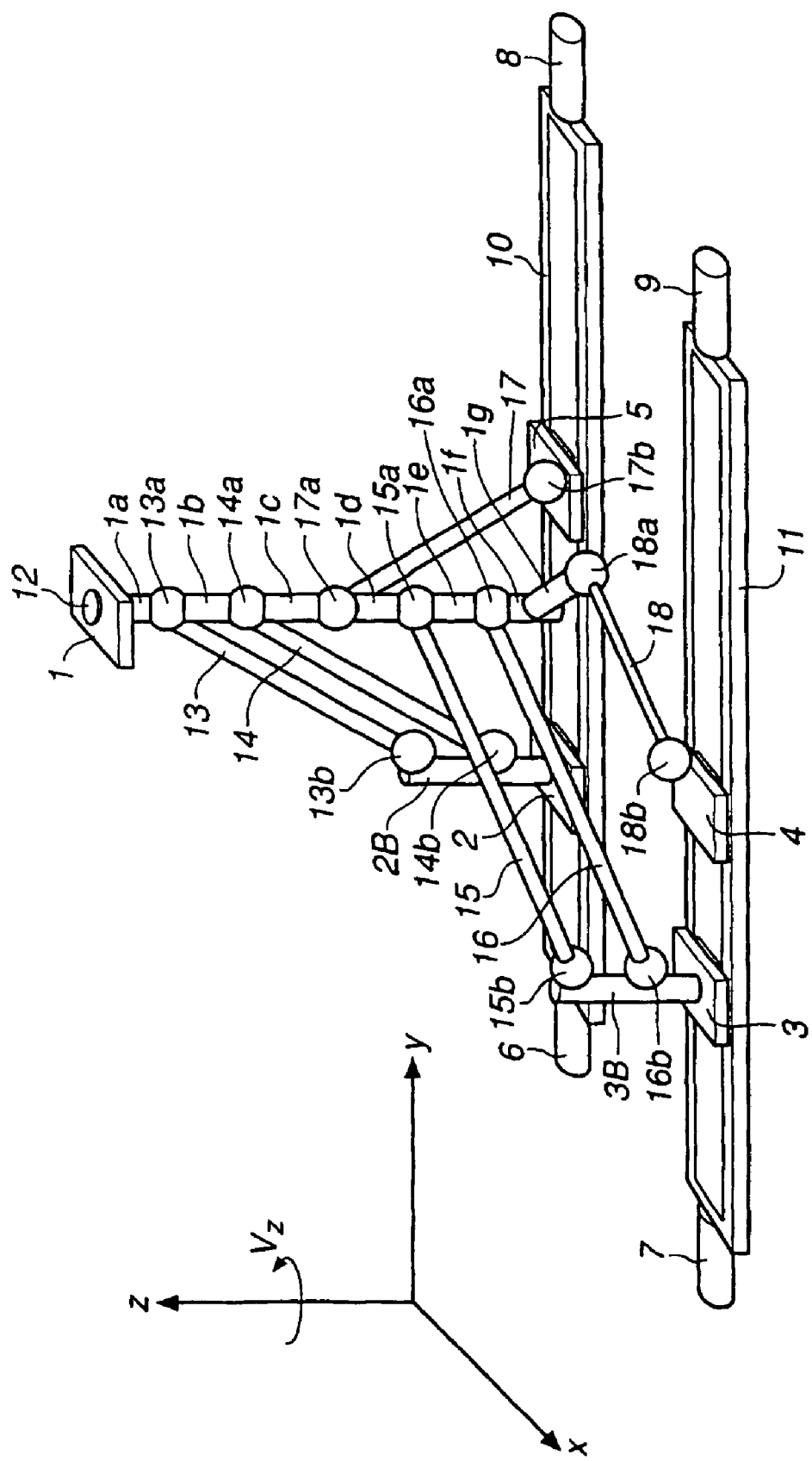
FIG. 4 is an advantageous embodiment of the manipulator according to FIG. 4, wherein only four movable units on only two linear paths manipulate the position and orientation of the platform around only one axis.

FIG. 4 shows a structure that does not involve the disadvantage that a rotation of the platform 1 may give rise to a change of the inclination of the platform. Here, the platform 1 is mounted on a vertical platform rod (1a–1f), on which the joints 13a, 14a, 17a, 15a and 16a are mounted. The platform rod also includes a horizontal lever arm 1g, at the end of which the joint 18 is mounted. The joints 13a and 14a connect the parallel and equally long links 13 and 14 to the vertical platform rod and at their other ends these links are connected via the joints 13b and 14b to the rod 2B, which is parallel to the platform rod and which is mounted on the movable unit 2. In the same way, the joints 15a and 16b connect the parallel and equally long links 15 and 16 to the platform rod. At their other ends, the parallel links 15 and 16 are mounted on the rod 3B via the joints 15b and 16b. The rod 3B is parallel to the platform rod and is mounted on the movable unit 3. The joint 17b is used for the link 17, which, via the joint 17b, is manipulated by the movable unit 5. The links 13–17 lock all the degrees of freedom of the platform rod except the rotation around its symmetry axis. To lock (and manipulate) this degree of freedom, the link 18 is used which, via the joint 18a and the lever arm 1g, can rotate the lever arm rod and hence the platform 1. At its other end, the link 18 is mounted, via the joint 18b, on the movable unit 4, which thus controls the orientation of the platform 1 without influencing the inclination of the platform (the inclination being determined by the rods 2B and 3B via the links 13, 14, 15 and 16).

The joints on the platform rod may be implemented as universal joints, ball joints or with suitably arranged ball bearings. FIG. 5a shows an implementation using ball joints. The balls for the joints 13a, 14a, 15a, 16a and 17a have a vertical hole through which a shaft 20 extends which connects the platform 1 to the lever arm 1g. Between the ball to the joint 13a and the platform 1, a sleeve 1a is mounted, and between the balls to the joints 14a–16a the sleeves 1a–1e are mounted, and below the ball to the joint 16a the sleeve 1f is mounted. With the nut 21 on the shaft 20, the balls 13a–17a with the intermediate sleeves are clamped in the platform 1, thus forming a platform rod. In the shaft 10, the lever arm 1g is fixedly mounted such that a movement of the link 18 gives rise to a rotation of the platform rod, which is journalled in the joints 13a–17a. The design of the joints 13a–17a is shown in FIG. 4b, exemplified by the joint 17a. The joint is seen in cross section from above with the shaft 20 inside the perforated ball. On the link 17, a joint holder 22 is mounted. The joint holder presses the angle 23 against one side of the ball and the plate 24 against the other side of the ball. The angle 23 gives at least three contact surfaces with the ball and the plate 24 at least one contact surface. The corresponding joint design may also be implemented on the rods 2B and 3B in FIG. 4.

Figure 5B:
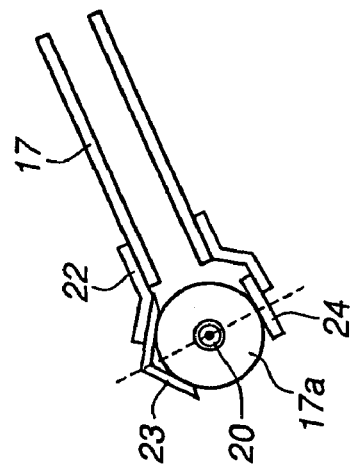
FIG. 5a and FIG. 5b are advantageous implementations of the joint arrangement of the manipulator according to FIG. 4.
Figure 5A:
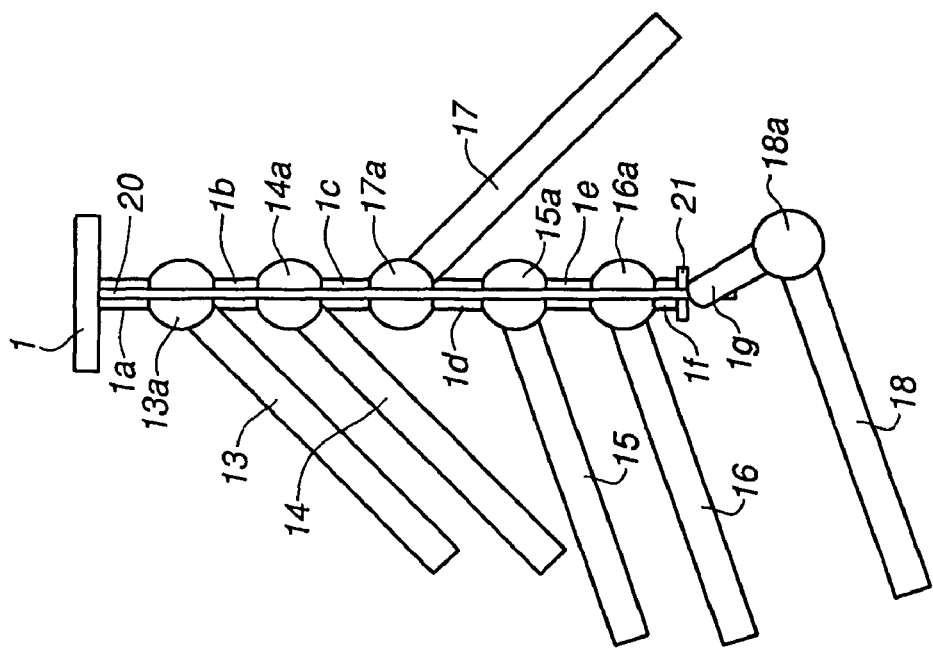
Figure 6:
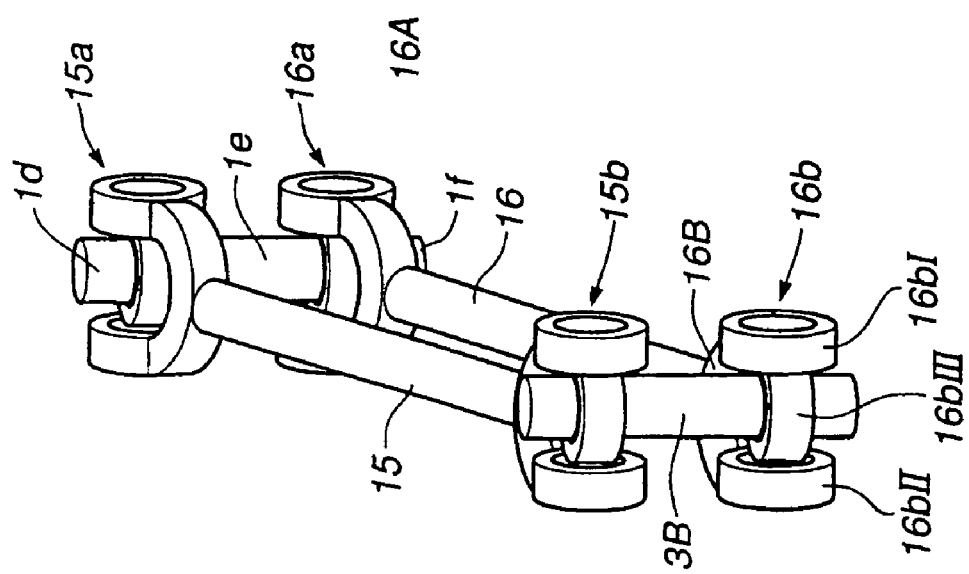
FIG. 6 is another advantageous implementations of the joint arrangement of the manipulator according to FIG. 4, and then in particular when the platform is subjected to great forces and torques.

The embodiment of the joints according to FIGS. 5a and 5b is primarily suited for applications where not too large forces are to be applied to the platform 1. In those cases where larger forces influence the platform 1, universal joints or angularly adjusted ball or roller bearings according to FIG. 6 may be used. The figure exemplifies the joint arrangement with the links 15 and 16. The implementation of the joints themselves is explained starting from the joint 16b. On the rod 3B a bearing 16bIII is mounted, and on both sides of this bearing, two other bearings 16bII and 16bI are mounted. In the figure, the axis of rotation for the bearing 16bIII is vertical and for the bearings 16bI and 16bII horizontal. On the bearings 16bI and 16bII, a bridge 16B is mounted (the bridge 16A at the other end of the link 16 being more clearly shown), and on this bridge the link 16 is mounted. With this design, the platform rod interconnects the joints by simply mounting the bearings with a vertical axis of rotation on the rods, and the parts 1d, 1e, etc., of the rod are thus in this case a continuous shaft.

Figure 7:
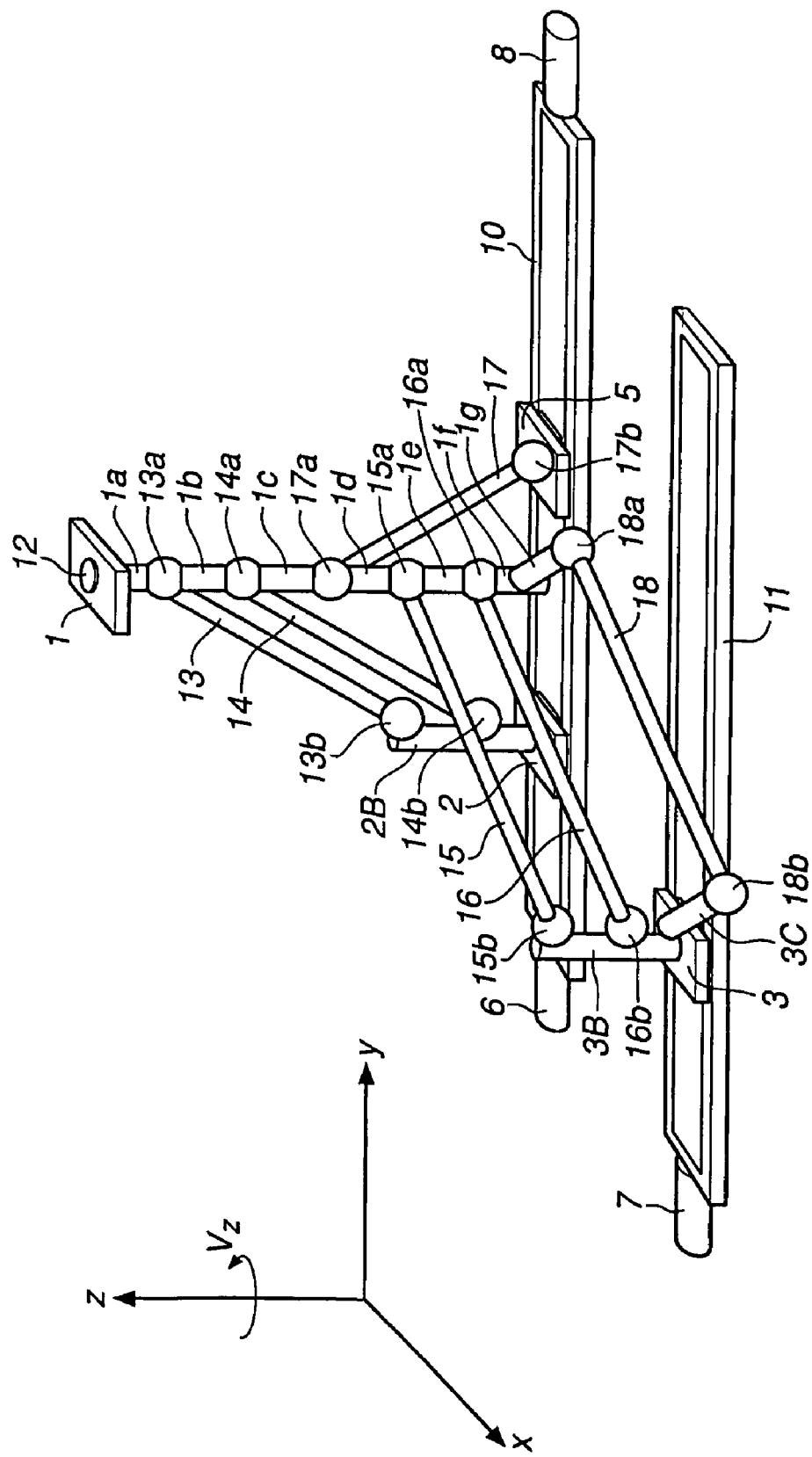
FIG. 7 is a modification of the manipulator in FIG. 4 with three movable units for manipulating the position of the platform only, whereas the inclination and orientation thereof are maintained constant.

The manipulator in FIG. 4 manipulates the platform 1 with four degrees of freedom. For the sake of completeness, FIG. 7 shows the base structure for manipulation with three degrees of freedom. The links 13, 14, 15, 16 and 17 are mounted in exactly the same way as in FIG. 4. The only difference is that the link 18 is now mounted on the movable unit 3 and that the movable unit 4 with the associated actuator 9 has been removed. The link 18 is chosen with the same length as the links 15 and 16 and is mounted so as to become parallel to these links. To this end, the movable unit 3 is provided with an arm 3C, which together with the lever arm 1g ensures that the link 18 is parallel to the links 15 and 16. Alternatively, the link 18 is mounted on the movable unit 2 or 5 and then parallel to the links 13, 14 and 17, respectively. By moving the units 2, 3 and 5, the position in the x-, y- and z-directions of the platform 1 can now be controlled.

Figure 8:
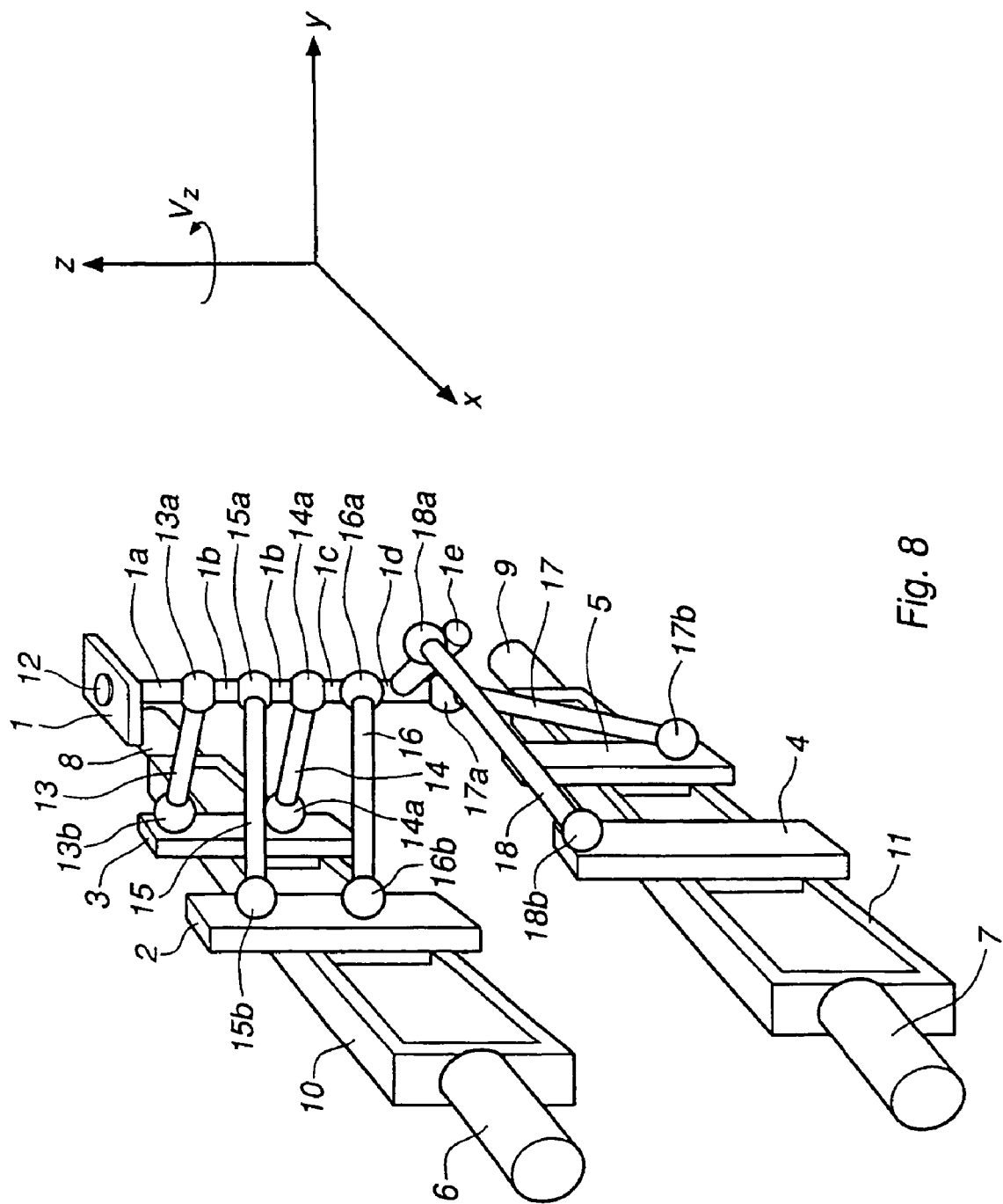
FIG. 8 is a wall-mounted manipulator of the same type as the manipulator according to FIG. 4.

In FIGS. 4 and 7, the platform rod is perpendicular to the surface, which is clamped by the linear paths 10 and 11. However, the platform rod may be given a different angle relative to the linear paths by inclining the rods 2B and 3B, provided, however, that the rods 2B and 3B are still parallel. In an extreme case, the rods 2B and 3B are chosen to be parallel to the plane that is clamped by the linear paths, and such a configuration is shown in FIG. 8. Here, the linear paths are wall-mounted above each other and approximately at the same plane, which, however, is not necessary. The tilt angles of the platform 1 are locked by the links 13, 14, 15 and 16, which also substantially control the movement of the platform in the xy-plane. The link 17 substantially controls the movement of the platform in the z-direction, and the link 18 controls the rotation of the platform around the z-axis (Vz). In the same way as in FIG. 7, the rotation of the platform around the z-axis may be maintained constant by mounting the link 18 on the unit 2 or the unit 3 or the unit 5. In all three cases, the link 18 is mounted parallel to the link/links which is/are already on the platform in question and is made with the same length as this link/these links.

Figure 9:
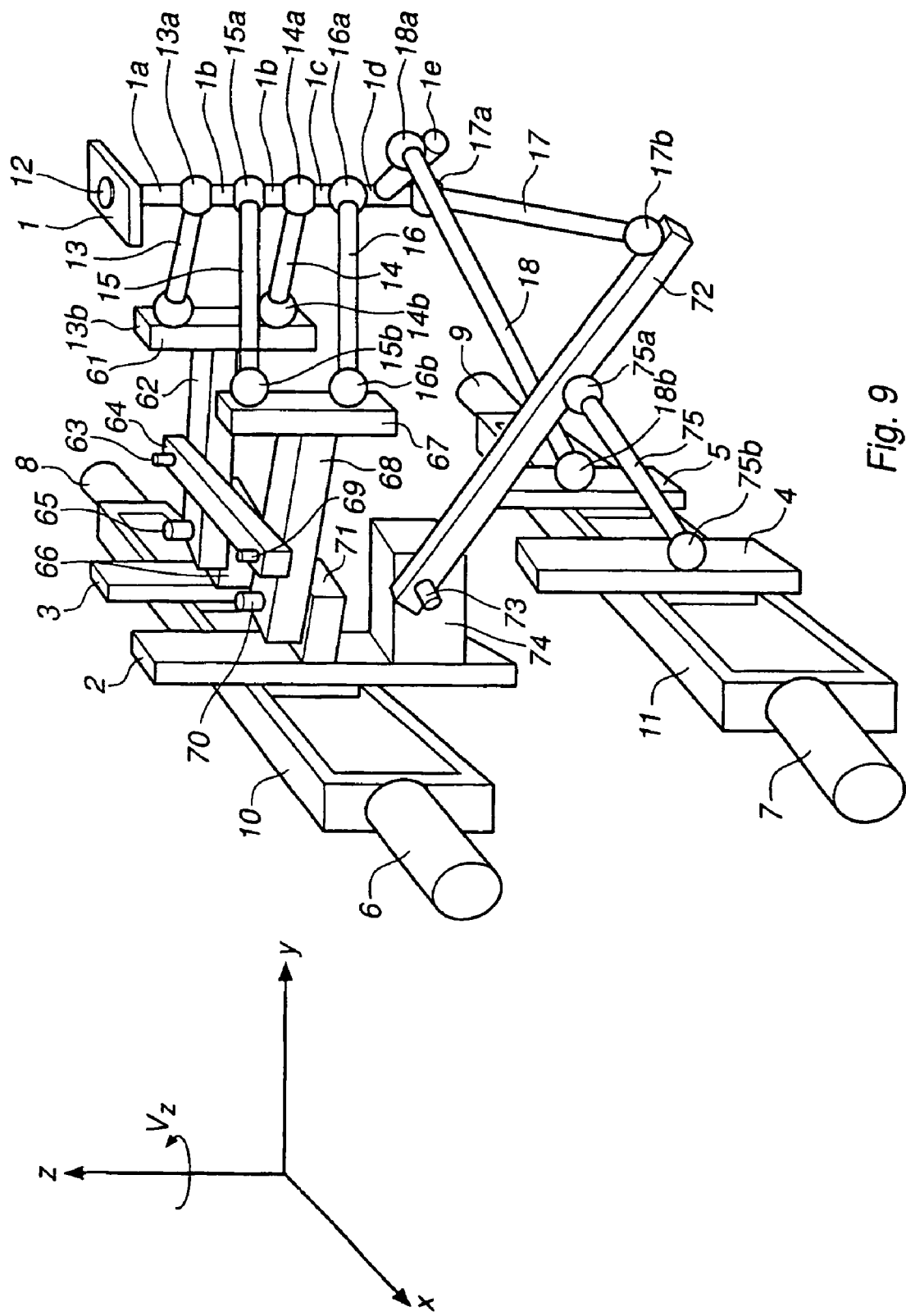
FIG. 9 is a modified wall-mounted manipulator for obtaining a larger working range for the positioning of the platform.

FIG. 9 shows an arrangement, which has the advantage that the manipulator may be given a larger working range relative to the length of the linear paths 10 and 11. This is achieved by providing the manipulator with an extra set of arms 62, 68 and 72 with the task of imparting to the links 13, 14 and 15, 16 and 17, respectively, larger movements than in previous embodiments where these links are directly mounted on the movable units of the linear paths. However, this advantage entails the disadvantage that the mechanics becomes more complex and that the manipulator becomes mechanically less rigid. The links 13 and 14 are here mounted, via the joints 13b and 14b, on a vertical beam 61 which may be pivoted in the horizontal plane by being fixedly mounted on the swinging arm 62. This swinging arm is mounted, via the joint 65 (1 degree of freedom), on the block 66 which is mounted on the movable unit 66. In a corresponding way, the links 15 and 16 are mounted on the beam 67, which is secured to the swinging arm 68. This swinging arm is mounted on the movable unit 2 via the joint 70 and the block 71. Between the swinging arms 62 and 68, there is a bar 64, which is articulately connected to the swinging arms through joints 63 and 69. This bar causes a relative movement between the movable units 2 and 3 to give rise to a pivoting movement of the swinging arms 68 and 69, which in turn entails a movement in the y-direction of the platform 1. To obtain upward and downward movements of the platform 1, the link 17 is mounted, via the joint 17a, to a swinging arm 72, which is substantially adapted to swing in the vertical plane. The arm 72 is connected, via the joint 73, to the block 74 on the movable unit 2. The arm 72 is caused to swing by the relative movement between the movable unit 2 and the movable unit 4. This is made possible through the link 75, which connects the movable unit 4 to the swinging arm 72 by means of the joints 75b and 75a. The rotation of the platform 1 is obtained in the same way as in FIG. 8 with the aid of the lever arm 1e and the link 18.

Figure 10:
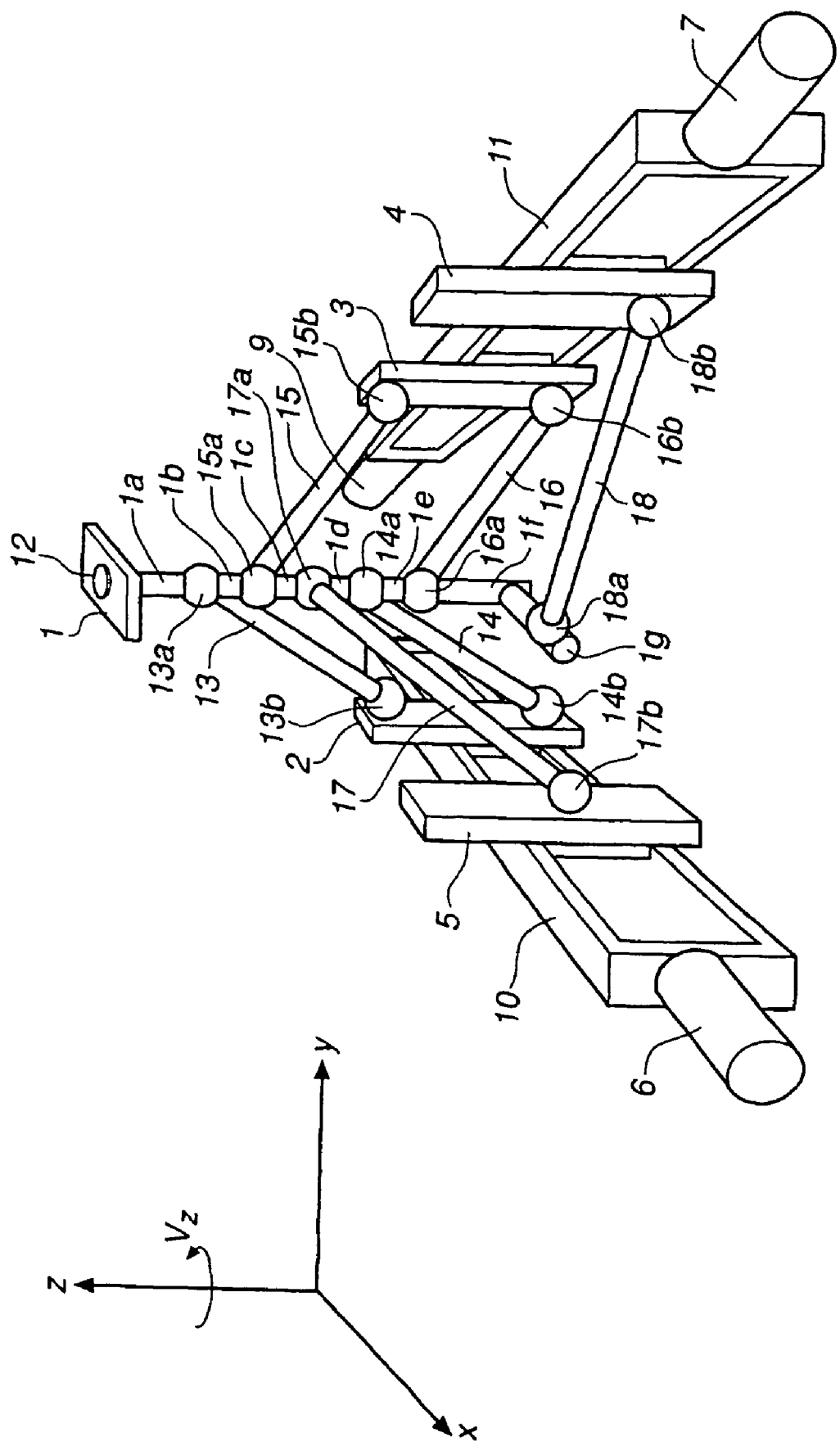
FIG. 10 is an advantageous configuration of the linear paths for obtaining a large working range of the manipulator in the horizontal plane in the case of floor mounting.

FIG. 10 shows an alternative configuration for obtaining a larger working range. The linear paths 10 and 11 are here located on the side, facing each other, and are mutually parallel (distorted perspective in the figure). The link pairs 13, 14 and 15, 16 are mounted on the movable units 2 and 3, respectively, the single link 17 is mounted on the movable unit 5 and the link 18, which is responsible for the rotation of the platform 1 around the z-axis, is mounted on the unit 4. By connecting the unit 18 to any of unit 2, 3 or 5 as previously described, the platform 1 may be positioned under a constant angle or rotation.

Figure 11:
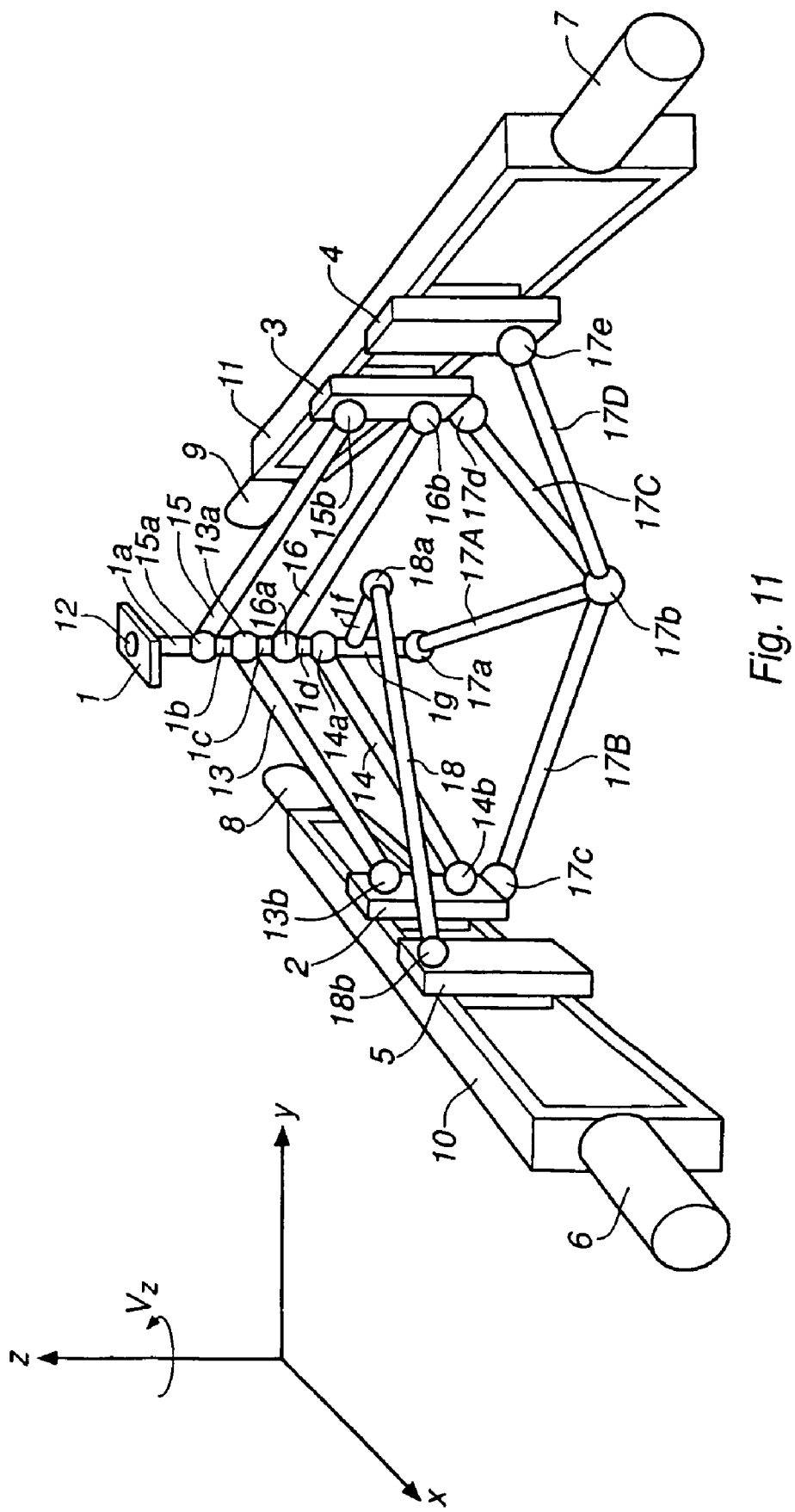
FIG. 11 is a first embodiment of the manipulator for obtaining a large working range also in the vertical plane with a configuration of the linear paths according to FIG. 10.

The configuration with the link pairs 13, 14 and 15, 16 manipulated between the linear paths 10 and 11 opens up new possibilities for obtaining a parallel kinematic gantry manipulator with a very large working range. To be successful in doing so, however, an arrangement of link 17 different from that in FIG. 10 is required. An example of such an arrangement is shown in FIG. 11. The link 17 is here manipulated by the movable unit 4 via the joint 17b, the link 17D and the joint 17e. When the joint 17e is moved by the movable unit 4 along the linear path 11, the joint 17b will be swung around an axis, which extends between the joints 17c and 17d. This oscillation gives rise to large vertical movements of the joint 17a, resulting in the platform 1 being manipulated with a large working range in the z-direction. The joint 17b is connected to the joints 17c and 17d with the aid of the links 17B and 17C and the platform 1 will be manipulated in the z-direction as soon as any of the movable units 2, 3 and 4 are moved relative to one another. In other respects, the manipulator in FIG. 11 is identical with that shown in FIG. 10.

Figure 12:
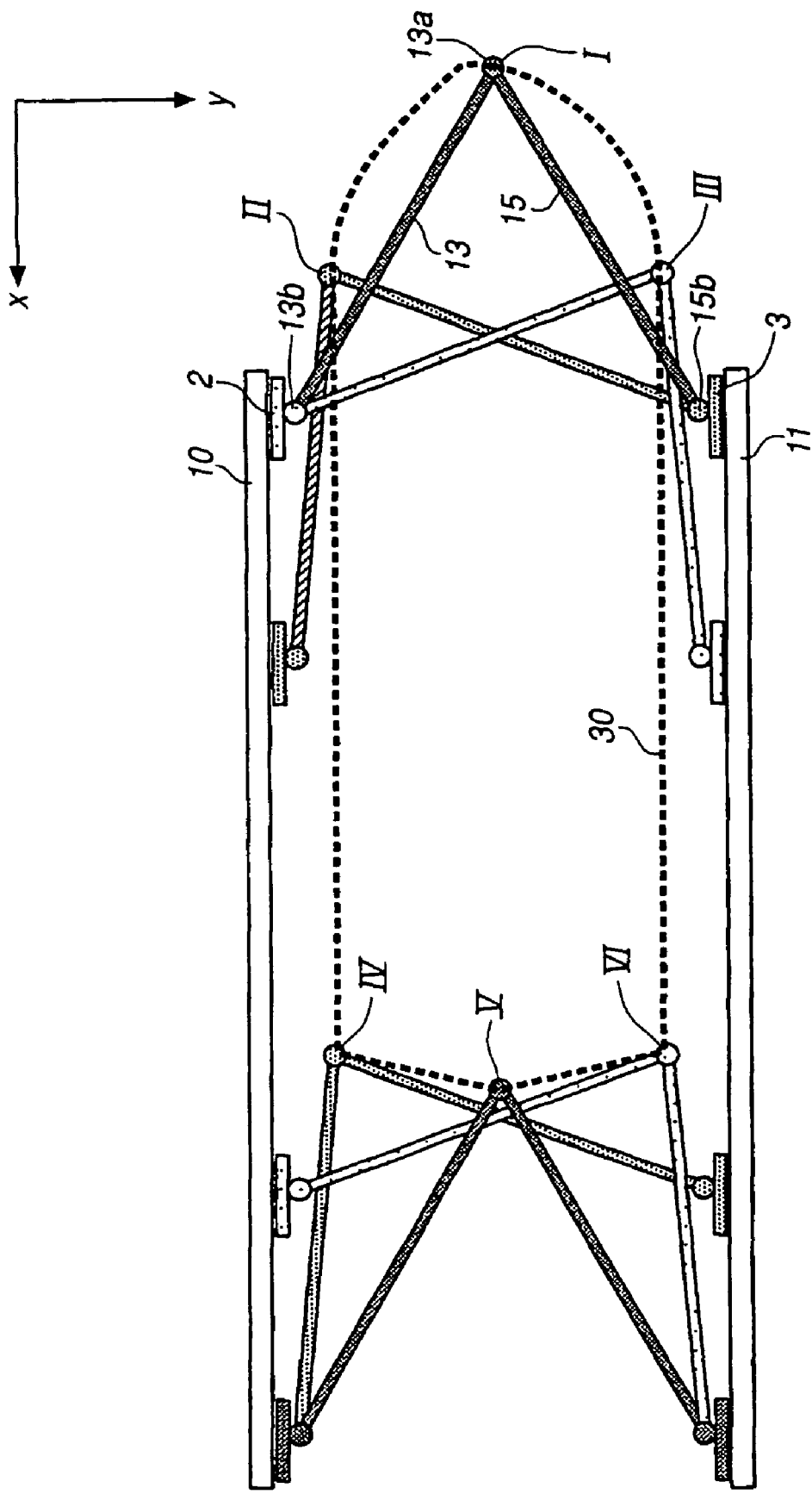
FIG. 12 is the working range in the horizontal plane which is obtained with a configuration of the linear paths according to FIGS. 10 and 11.

As mentioned above, a parallel kinematic gantry robot with parallel links operating between the linear paths will be given a very large working range. This is illustrated in FIG. 12, which is a simplified projection of the manipulator according to FIG. 11, viewed from above. Only the movable units 2 and 3, which determine the working range in the xy-plane, are shown together with associated upper links 13 and 15 as well as one of the joints (13a) on the platform rod and the joints 13b and 15b on the movable units. If the links 13 and 15 are each made longer than the distance between the parallel linear paths, the working range of the manipulator in the xy-plane will be able to cover a surface almost as large as the surface between the linear paths. With a suitable arrangement for manipulation of the platform 1 in the z-direction, this working range in xy-plane will apply also to a relatively large depth in the z-direction, even if the working range will always become narrower below and above the plane formed by the linear paths 10 and 11.

Figure 13:
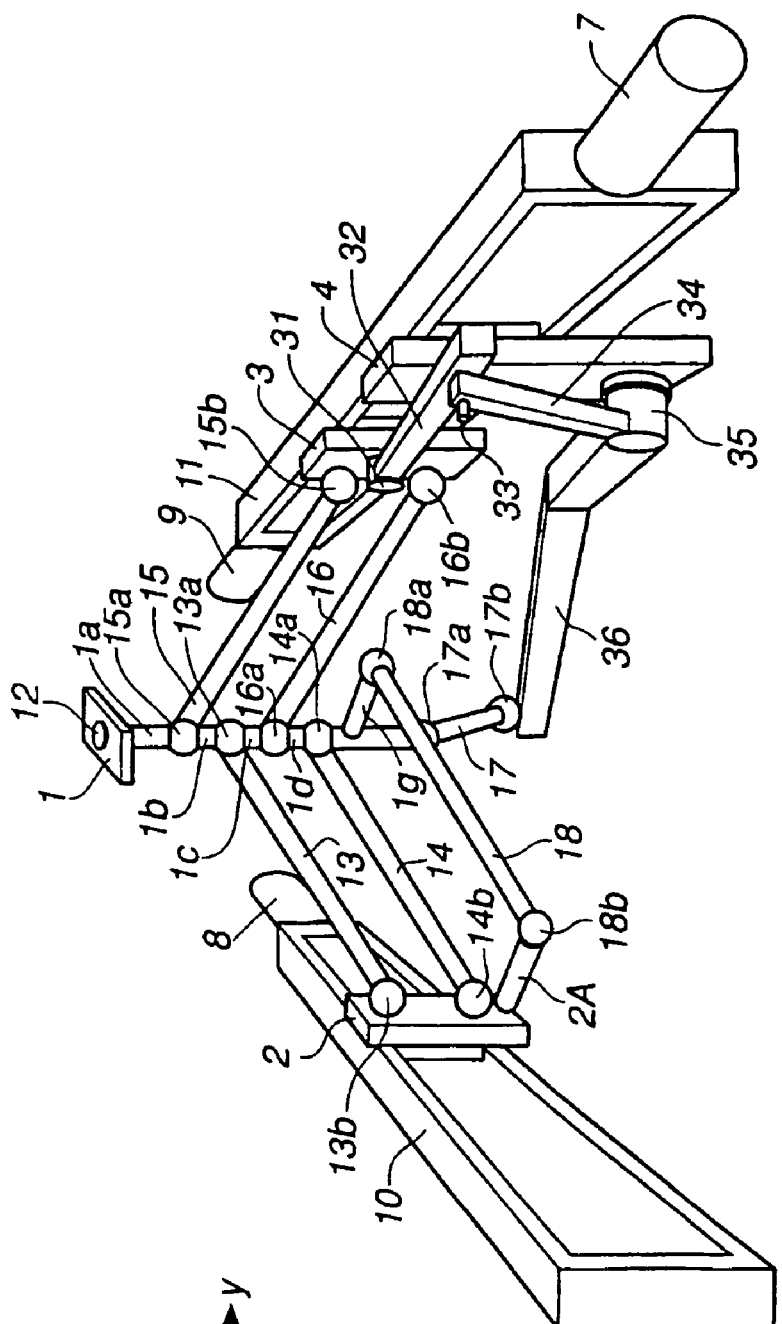
FIG. 13 is a variant of the embodiment of the manipulator in FIG. 11 for obtaining a large working range also in the vertical plane.

A somewhat simpler arrangement for obtaining a large working range in the z-direction is shown in FIG. 13. Here, the link 17 is mounted on the arm 36 via the joint 17b (with two or three degrees of freedom), the arm 36 in turn being connected to the movable unit 4 through the joint 35 (with one degree of freedom). The arm 36 is caused to swing around the axis of the joint 35 when the movable units 3 and 4 move relative to each other. This function is achieved by the fact that the arm 36 has a lever arm 34, which, via the joint 33, is connected to the movable unit 3 via the arm 32. The arm 32 is fixedly mounted on the movable unit 3 with the aid of the joint 31, which allows the arm 32 to swing in the vertical plane. The links 13–16 are arranged in the same way as in FIGS. 10 and 11. On the other hand, the link 18 is configured to maintain a constant angle of rotation of the platform 1. This is achieved by allowing the link 18 to form a parallelogram with the links 13 and 14, which is achieved with the arm 2A fixedly mounted on the movable unit 2. As an alternative, the link 18 may be mounted in a corresponding way on the movable unit 3.

Figure 14:
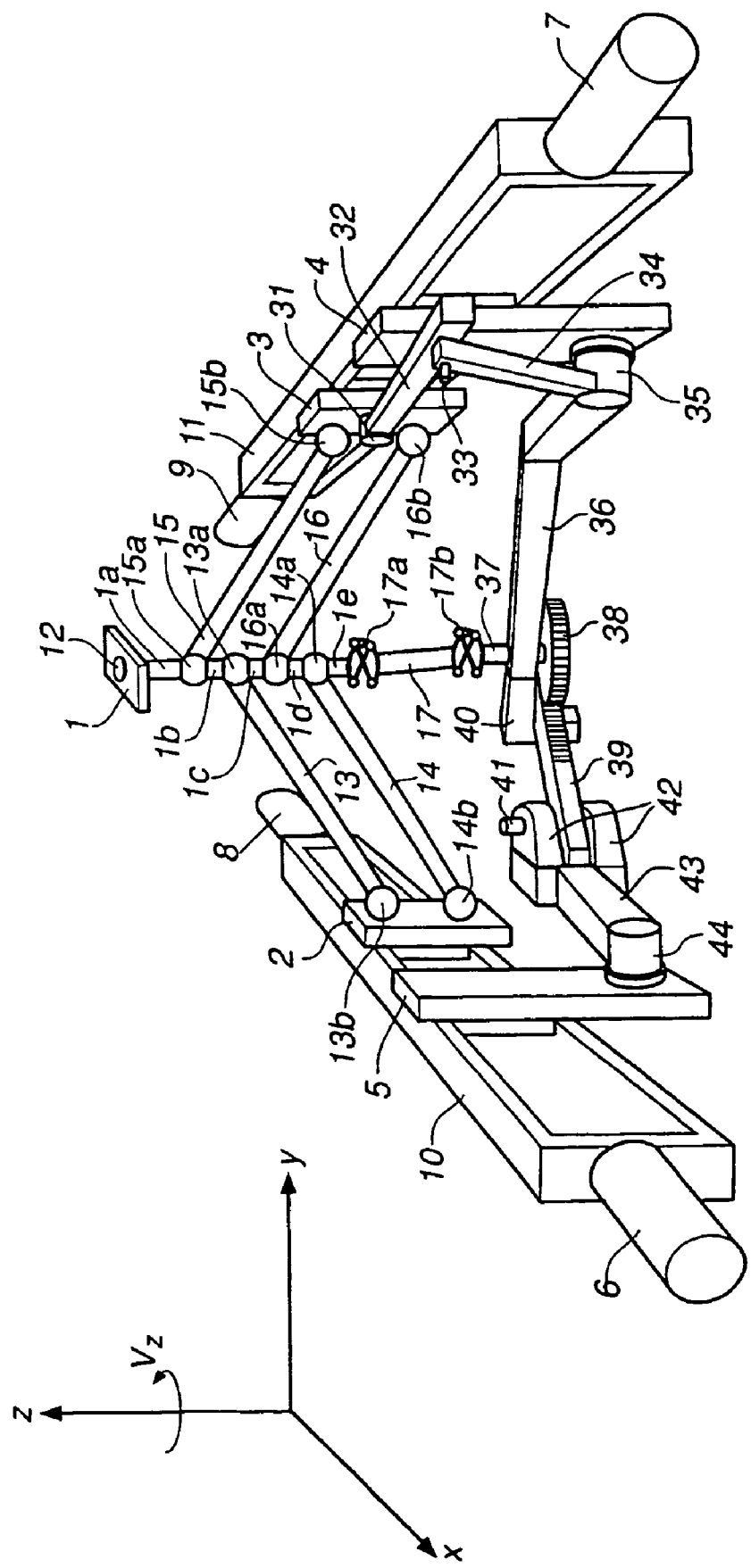
FIG. 14 is an embodiment of the manipulator according to FIG. 13 for obtaining a large working range also in the case of rotation of the platform around an axis.

In several cases it is desired to rotate the platform 1 at least one full turn around the z-axis. FIG. 14 shows one way of doing this. The link 17 here has a universal joint at each end, whereby the link will function as a universal driving shaft transmission. The universal joint 17b is connected to the gear wheel 38 via the shaft 37. The shaft 37 is maintained single-axis-articulated by the arm 36, which also holds the slide 40 for the rack 39. The rack 39, in turn, is mounted on the movable unit 5 via the joint 41, the fork 42, the arm 43 and the joint 44. The device for controlling the arm 36 is the same as in FIG. 13. When the movable unit 5 is moved relative to the movable unit 4, the rack 39 will move in the slide 40 and hence rotate on the gear wheel 38, which in turn results in the universal transmission 17b, 17 and 17a imparting to the platform rod 1a–1e, and hence to the platform 1, a rotational movement around the z-axis.

Figure 15:
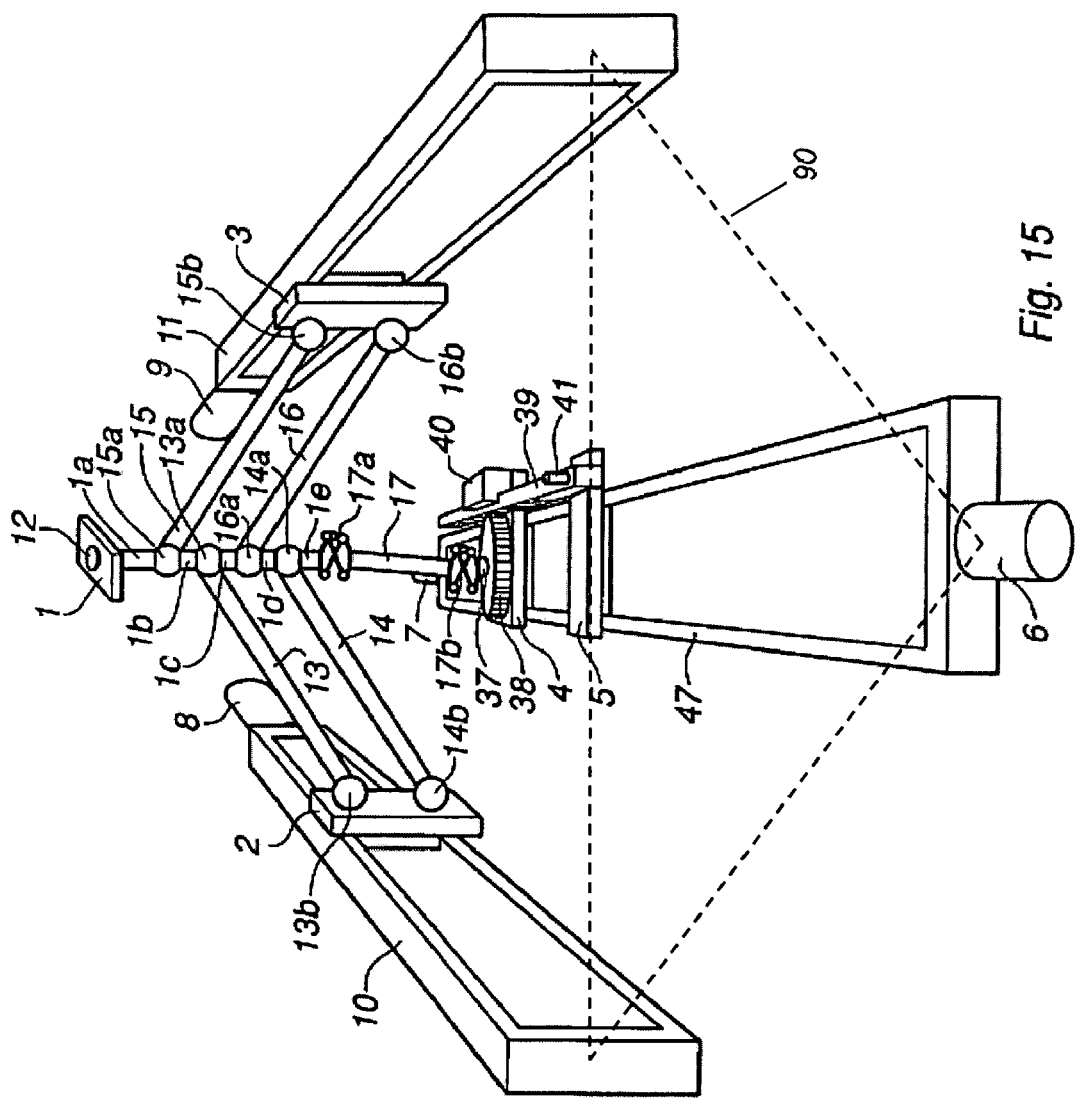
FIG. 15 is an alternative embodiment with a third linear path for obtaining a large working range also in the case of rotation of the platform.

The arrangement with the arms 36 and 43 in FIG. 14 may result in certain problems as regards the rigidity of the platform to forces in the z-direction and torque around the z-axis. One way of increasing the rigidity with regard to these components is to introduce another linear path 47 according to FIG. 15. The linear paths 10 and 11 now only have the movable units 2 and 3 whereas the movable units 4 and 5 are located on the linear path 47. It should be pointed out here that a linear path may very well consist of two separate tracks, one for each movable unit. However, there is never any need of the movable units passing each other, so the most economical solution is to allow two units to share the same track but have different drive transmissions such as, for example, ball screws and belts. The linear path 47 is responsible for the movements of the platform in the z-direction and its rotation around the z-axis. The movement in the z-direction is achieved by movement of the movable unit 4, whereby the link 17 moves the platform rod 1a–1e up or down. The rotation around the z-axis is achieved by moving the movable unit 5 relative to the movable unit 4. This will cause the rack 39 to rotate the gear wheel 38, which in turn rotates the universal transmission 17b, 17, 17a, resulting in the platform rod and hence the platform 1 rotating. The gear wheel 38 is fixedly journalled in the movable unit 4 and the rack 39 is fixed in the movable unit 5 by means of the joint 41. The slide 40 for holding the rack 39 against the gear wheel 38 is mounted on the movable unit 4. In the embodiment shown in FIG. 15, the first, second and third paths are arranged such that the first and second coincident planes form the base in a triangle, and the third path forms the top of the triangle 90.

Figure 16:
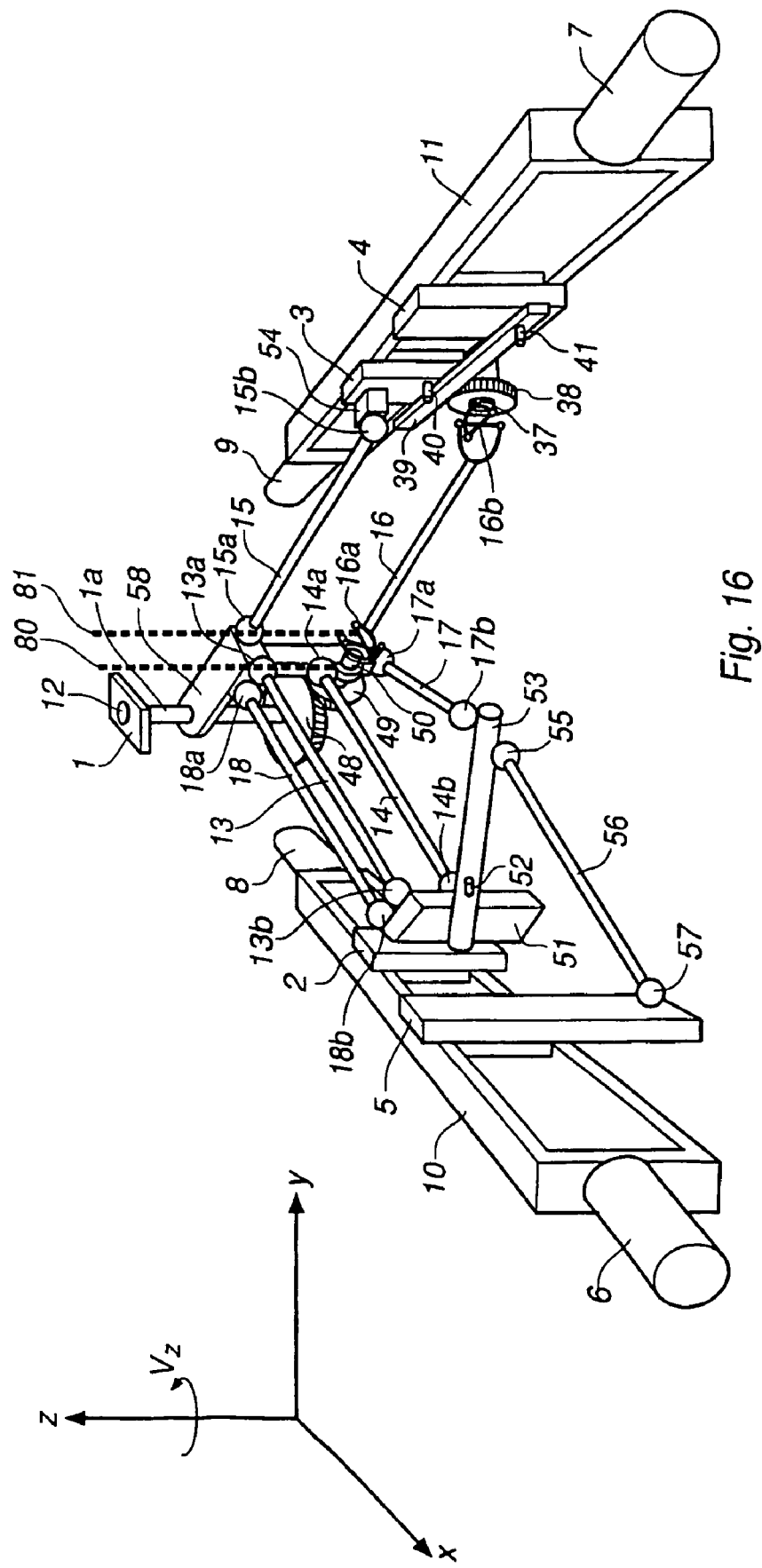
FIG. 16 is an advantageous alternative embodiment of the manipulator for obtaining a large working range of the manipulated platform, both with regard to positioning and rotation around an axis, using two linear paths and four movable units.

In principle, the universal transmission for transmitting a rotational movement to the platform 1 may be implemented by any of the links included in the manipulator. FIG. 16 illustrates this fact. Here, the link 16 is used for the universal transmission, and for obtaining the correct direction of the rotational movement to the platform 1, a bevel gear pair with the wheels 48 and 49 is used. The platform 1 is here mounted on a shaft 1a, which is mounted in a bearing in the gear wheel holder 58. The orientation and the position of the gear wheel holder 58 are determined by the links 13–18, where the link 16 is at the same time used for transmitting the rotational movement. The universal joint 16a is in direct connection with the bevel wheel 49 via the shaft 50 which is fixedly journalled to the gear wheel holder 58, the bevel wheel 49 in its turn driving the bevel wheel 48 and hence the platform 1. At its other end the link 16 is in direct connection, via the universal joint 16b, with the gear wheel 38 by means of the shaft 37, which gear wheel 38 is journalled in the movable unit 3. In the same way as in FIG. 15, the gear wheel is driven round by a rack 39, which is fixed to the movable unit 4 with the joint 41. On the movable unit 3, the rack 39 is pressed against the gear wheel 38 by a bearing 40, whereby a relative movement between the movable units 3 and 4 gives rise to a rotation of the gear wheel 38. For the manipulation in the z-direction, the link 17 is connected at its other end, via the joint 17b, to the arm 53 which, by means of the joint 52, is mounted on an angle holder 51 on the movable unit 2. The arm 53 is caused by the link 56 to swing around the joint 52 when the movable unit 5 moves relative to the movable unit 2.

FIG. 16 also shows the two mathematical lines 80 and 81. These are defined by centre points for the joints 13a, 14a and 15a, 16a, respectively. Common to the manipulators which have been described so far and which characterize the invention is that these mathematical lines (80, 81) are parallel. In FIGS. 4, 5, 7, 8, 9, 10, 11, 13, 14 and 15, these lines are, in addition, coinciding.

Figure 17:
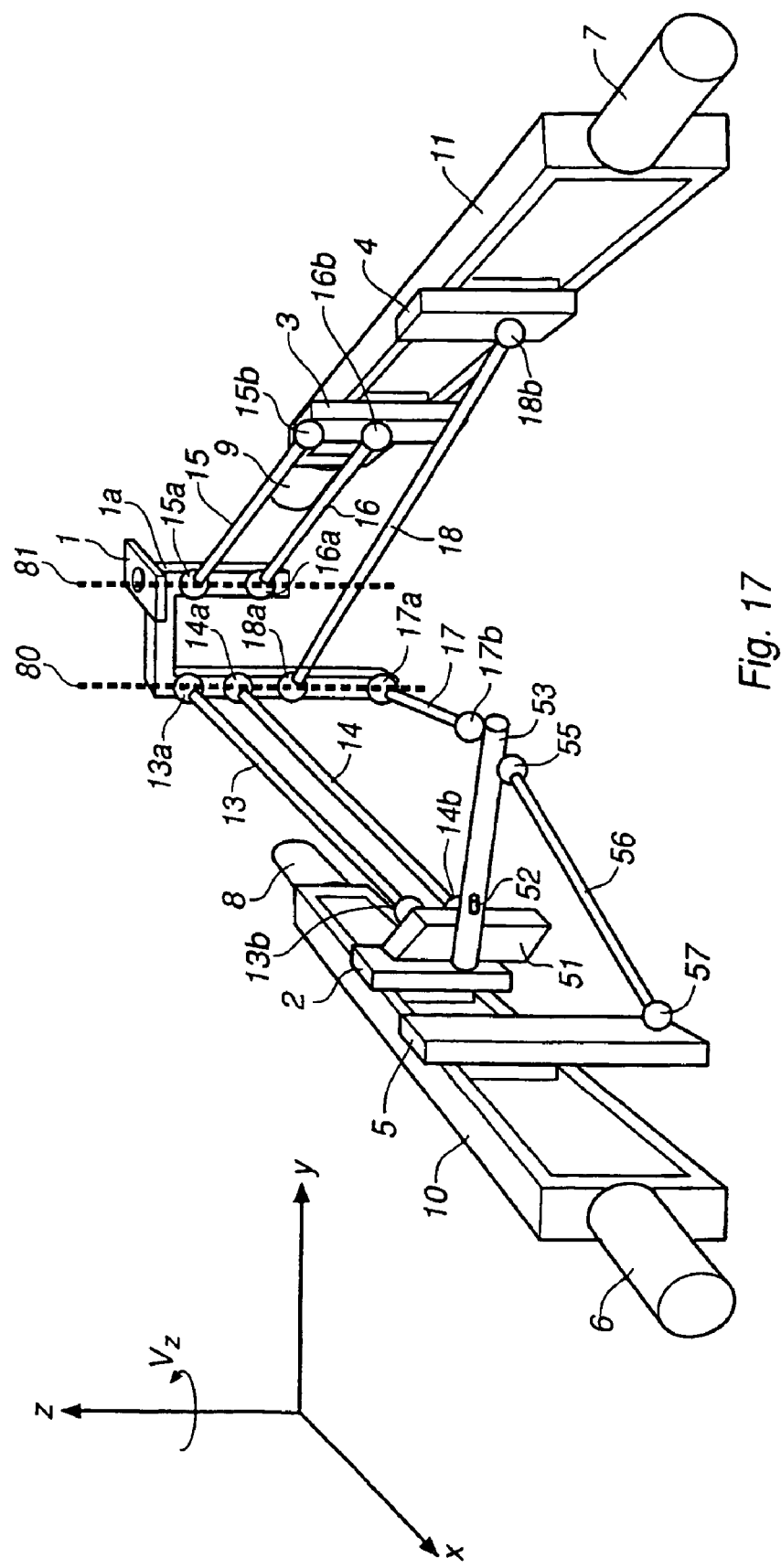
FIG. 17 is a variant of an embodiment of the manipulator in FIG. 16 when a simple design is more important than a large working range for rotation of the platform.

It is necessary that the mathematical lines 80 and 81 be parallel for the platform 1 to be able to rotate without obtaining a simultaneous change of the inclination. This is exemplified by FIGS. 17 and 18. In FIG. 17, the lines 80 and 81 are parallel and the platform 1 is given a pure rotational movement when the movable unit 4 moves relative to the movable unit 3. In FIG. 18, however, the lines 80 and 81 are not parallel and when the movable unit 4 moves relative to the movable unit 3 in this case, the inclination of the platform 1 will at the same time be changed, which is not desirable in the majority of applications.

FIG. 17 is a variant of the basic structure in FIG. 16. The rotation of the platform 1 is carried out in FIG. 17 by the link 18 instead of by means of the universal transmission and the bevel gear pair as in FIG. 16. This provides a simpler manipulator design, but at the expense of a smaller number of rotations of the platform being carried out.

In FIG. 18, the platform 1 is in the form of a frame such that the mathematical line 80 becomes vertical and the mathematical line 81 horizontal. The links 17 and 18 are so mounted that the joints 17a and 18a form a mathematical line in the horizontal plane, which may not be parallel to the line 81. The links 17 and 18 are manipulated by the movable unit 4 on the linear path 47 mounted horizontally over the working range, the link 15 is manipulated by the movable unit 4 and the link 16 by the movable unit 4, both on the vertically angled path 11, and the links 13 and 14 are manipulated by the movable unit 2 on the vertically angled opposite path 10. To obtain the desired geometrical relationships between the points of mounting of the link 17 and 18, an angled beam 4B is used on the movable unit 4. If the links 15 and 16 are held parallel provided that they are of equal length, the platform 1 may be manipulated with a constant inclination.

What is claimed is:

1. An industrial robot for movement of an object in space, the industrial robot comprising:
   a platform arranged to carry the object;
   a first arm arranged to influence the platform in a first movement, the first arm comprising
      a first actuator having a first path arranged in a first plane,
      a first carriage linearly movable along the first path,
      at least two links, each link comprising an outer joint operatively connected with the platform and an inner joint operatively connected with the first carriage, whereby the inner joints are displaceable in parallel, and
      a third link comprising an inner joint operatively connected to the first carriage and an outer joint operatively connected to the platform;
   a second arm arranged to influence the platform in a second movement, the second arm comprising
      a second actuator having a second path arranged in a second plane,
      a second carriage linearly movable along the second path, and
      two links, each link comprising an outer joint operatively connected with the platform and an inner joint operatively connected to the second carriage, whereby the two inner joints are displaceable in parallel; and
   a third arm arranged for influencing the platform in a third movement, the third link comprising
      a third actuator, and
      a link comprising an outer joint operatively connected with the platform and an inner joint operatively connected with the third actuator,
   wherein the first and second planes coincide, and wherein the first and second movable carriages are mounted such that the two links of the first arm and the two links of the second arm are movable between opposite sides of the coincident planes.

2. The industrial robot according to claim 1, wherein the three links of the first arm are arranged in parallel.

3. The industrial robot according to claim 1, wherein the third actuator comprises a third motor, a third path arranged in a third plane and a third carriage linearly movable along the third path, whereby the inner joint is linearly displaceable.

4. The industrial robot according to claim 3, wherein the first, second and third paths are arranged such that the first and second coincident planes form the base in a triangle, and the third path forms the top of the triangle.

5. The industrial robot according to claim 1, wherein all of the outer joints are arranged on a straight line.

6. The industrial robot according to claim 1, wherein the links of the first arm, the first carriage and the platform form a first parallelogram, and the links of the second arm, the second carriage, and the platform form a second parallelogram.

7. The industrial robot according to claim 1, wherein the joints of the first arm and the joints of the second arm are arranged with three degrees of freedom.

8. An industrial robot for movement of an object in space, the industrial robot comprising:
   a platform arranged to carry the object;
   a first arm arranged to influence the platform in a first movement, the first arm comprising
      a first actuator having a first path arranged in a first plane,
      a first carriage linearly movable along the first path, and
      at least two links, each link comprising an outer joint operatively connected with the platform and an inner joint operatively connected with the first carriage, whereby the inner joints are displaceable in parallel;
   a second arm arranged to influence the platform in a second movement, the second arm comprising
      a second actuator having a second path arranged in a second plane,
      a second carriage linearly movable along the second path, and
      two links, each link comprising an outer joint operatively connected with the platform and an inner joint operatively connected to the second carriage, whereby the two inner joints are displaceable in parallel; and
   a third arm arranged for influencing the platform in a third movement, the third link comprising
      a third actuator, and
      a link comprising an outer joint operatively connected with the platform and an inner joint operatively connected with the third actuator,
   wherein the first and second planes coincide, and wherein the first and second movable carriages are mounted such that the two links of the first arm and the two links of the second arm are movable between opposite sides of the coincident planes,
   wherein all of the outer joints are arranged on a straight line.

9. The industrial robot according to claim 8, wherein the first arm comprises a third link comprising an inner joint operatively connected to the first carriage and an outer joint operatively connected to the platform.

10. The industrial robot according to claim 8, wherein the third actuator comprises a third motor, a third path arranged in a third plane and a third carriage linearly movable along the third path, whereby the inner joint is linearly displaceable.

* * * * *